(12) United States Patent
Han et al.

(10) Patent No.: US 10,513,976 B2
(45) Date of Patent: Dec. 24, 2019

(54) ENGINE SYSTEM

(71) Applicants: HYUNDAI MOTOR COMPANY, Seoul (KR); KIA MOTORS CORPORATION, Seoul (KR)

(72) Inventors: Dong Hee Han, Seoul (KR); Jong Il Park, Seoul (KR); Seungwoo Hong, Seoul (KR); Joowon Lee, Gwangju-si (KR); Yeongseop Park, Seoul (KR); Dong Ho Chu, Ansan-si (KR); Hyungbok Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 261 days.

(21) Appl. No.: 15/626,918

(22) Filed: Jun. 19, 2017

(65) Prior Publication Data

US 2018/0163616 A1  Jun. 14, 2018

(30) Foreign Application Priority Data

Dec. 13, 2016  (KR) .................... 10-2016-0169527

(51) Int. Cl.
| | |
|---|---|
| *F02B 39/10* | (2006.01) |
| *F02B 29/04* | (2006.01) |
| *F02D 41/00* | (2006.01) |
| *F02M 35/10* | (2006.01) |

(52) U.S. Cl.
CPC .......... *F02B 39/10* (2013.01); *F02B 29/0412* (2013.01); *F02D 41/0007* (2013.01); *F02D 41/0087* (2013.01); *F02M 35/10163* (2013.01); *F02D 2250/18* (2013.01); *Y02T 10/144* (2013.01); *Y02T 10/146* (2013.01)

(58) Field of Classification Search
CPC .. F02B 29/0412; F02B 39/10; F02D 2250/18; F02D 41/0007; F02D 41/0087; F02M 35/10163; Y02T 10/144; Y02T 10/146
See application file for complete search history.

(56) References Cited

U.S. PATENT DOCUMENTS

| | | | | |
|---|---|---|---|---|
| 6,938,420 | B2 * | 9/2005 | Kawamura | ............. F02B 33/34 60/612 |
| 7,107,972 | B1 * | 9/2006 | Jones | ...................... F02B 33/34 123/559.1 |
| 8,544,444 | B2 * | 10/2013 | Hitomi | ................ F02D 13/0238 123/294 |
| 9,038,384 | B2 * | 5/2015 | Tomita | .................. F02B 37/007 60/612 |
| 9,534,532 | B2 * | 1/2017 | Eybergen | ................ F02B 33/38 |
| 9,856,781 | B2 * | 1/2018 | Tsourapas | ............... F02B 33/36 |
| 9,915,195 | B2 * | 3/2018 | Verdoorn | .............. F02B 37/004 |
| 10,190,484 | B2 * | 1/2019 | Tabata | .................... F02D 41/10 |
| 2013/0146037 | A1 | 6/2013 | Han et al. | |
| 2018/0306144 | A1 * | 10/2018 | Redon | ..................... F02B 37/04 |

* cited by examiner

*Primary Examiner* — Jesse S Bogue
(74) *Attorney, Agent, or Firm* — Morgan, Lewis & Bockius LLP

(57) ABSTRACT

An engine system includes an engine including one or more cylinders for generating a driving torque, a plurality of intake lines for supplying external air to the one or more cylinders, and one or more electric superchargers disposed on, or in, the plurality of intake lines.

7 Claims, 6 Drawing Sheets

ENGINE SYSTEM

CROSS-REFERENCE TO RELATED APPLICATION

This application claims the benefit of priority to Korean Patent Application No. 10-2016-0169527, filed with the Korean Intellectual Property Office on Dec. 13, 2016, the entire contents of which are incorporated herein by reference.

TECHNICAL FIELD

The present disclosure relates to an engine system. More particularly, the present disclosure relates to an engine system that can realize a high compression ratio.

BACKGROUND

An engine appropriately mixes air and fuel and generates driving power by burning the mixed gases. In order to obtain a required, or desired, output of power and combustion efficiency, sufficient air should be supplied to the engine. For this, a turbocharger is used to increase combustion efficiency and supply sufficient air to the engine.

Generally, a turbine of the turbocharger is rotated by pressure of exhaust gas exhausted from the engine, a compressor of the turbocharger compresses fresh air flowing in from the outside, and the compressed air is supplied to a cylinder of the engine. The turbocharger has been applied to diesel engines, and has recently been applied to gasoline engines.

As another example, an electric supercharger compresses external air using a compressor operated by a motor. Since the electric supercharger is operated by the motor, there is little or no turbo lag. The electric supercharger mainly supplies compressed air to the cylinder in a low speed and low load region.

Generally, the turbocharger (hereinafter referred to as a 'mechanical turbocharger') operated by exhaust gas may have low responsiveness, and there is a problem in realizing an engine having a high compression ratio because of high back pressure. Also, since the turbocharger is exposed to high temperature exhaust gas (i.e., Celsius 700 degrees), design costs of peripheral parts of the turbocharger is increased.

Further, since the output power of the motor is limited according to an output of a battery provided in a vehicle, the usage of the electric supercharger is limited to a low and middle speed region.

Therefore, there is a demand for a new engine system having the mechanical turbocharger and the electric supercharger.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an engine system having a high compression ratio.

Further, the present disclosure has been made in an effort to provide an engine system that can improve responsiveness when an engine is controlled.

Further, the present disclosure has been made in an effort to provide an engine system that can reduce unnecessary pumping losses and improve fuel consumption by deactivating some cylinders in a low-speed operating region.

An engine system according to exemplary embodiments of the present disclosure may include an engine including a plurality of cylinders generating driving torque by burning fuel; a plurality of intake lines in which external air supplied to the cylinders flows; and electric superchargers disposed in the plurality of intake line, respectively.

The plurality of intake line may include a first intake line which external air supplied to the cylinders flows; and a second intake line which external air supplied to the cylinders flows.

The engine system may further include a bypass line connecting the first intake line and the second intake line.

The engine system may further include a first intake valve disposed in the first intake line; a second intake valve disposed in the second intake line; and a bypass valve disposed in the bypass line.

The first intake valve may be disposed in an upstream portion of the first electric supercharger, and the second intake valve may be disposed in an upstream portion of the second electric supercharger.

The first intake line and the second intake line may be merged into a main intake line, and a main intercooler may be disposed in the main intake line.

The engine system may further include a complementary intercooler disposed in the bypass line.

The first intake valve, the second intake valve and the bypass valve may be selectively opened, or opening of the valves may be adjusted based on a driving region of the engine.

The first intake valve and the second intake valve may be closed, supercharged air amount may be adjusted by opening of the bypass valve, and supercharged air may be supplied to the cylinders through the first electric supercharger and the second electric supercharger in a low and middle speed and a high load region.

The bypass valve may be closed, supercharged air amount may be adjusted by opening of the first intake valve and the second intake valve, and supercharged air may be supplied to the cylinders through the first electric supercharger and the second electric supercharger in a high speed and a high load region.

The engine system may further include a cylinder deactivation apparatus (CDA) which is disposed in a portion of cylinders among the plurality of cylinders and selectively deactivating the portion of cylinders.

The engine may be a four-cylinder engine sequentially including four cylinders of a first cylinder, a second cylinder, a third combustion chamber, and a fourth cylinder, and the CDA may be disposed in the second cylinder and third cylinder.

The first intake valve and the second intake valve may be closed, supercharged air amount may be adjusted by opening of the bypass valve, and supercharged air may be supplied to the cylinders through the first electric supercharger and the second electric supercharger in a driving region which the CDA operates.

The driving region which the CDA operates may be a low speed and a low load region.

According to exemplary embodiments of the present disclosure, it is possible to realize an engine system having two intake lines which supplies external air to an engine, and electric superchargers are disposed in each intake line.

Further, it is possible to increase design freedom of a vehicle and reduce manufacturing cost of the vehicle by using an electric supercharger having a reduced size and a low weight instead of a mechanical turbocharger having high volume and weight.

Further, output of an electric supercharger is limited by electric system of a vehicle, but it is possible to increase compression ratio of intake air and improve control responsiveness by using a plurality of electric supercharger.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION

Figure 1:
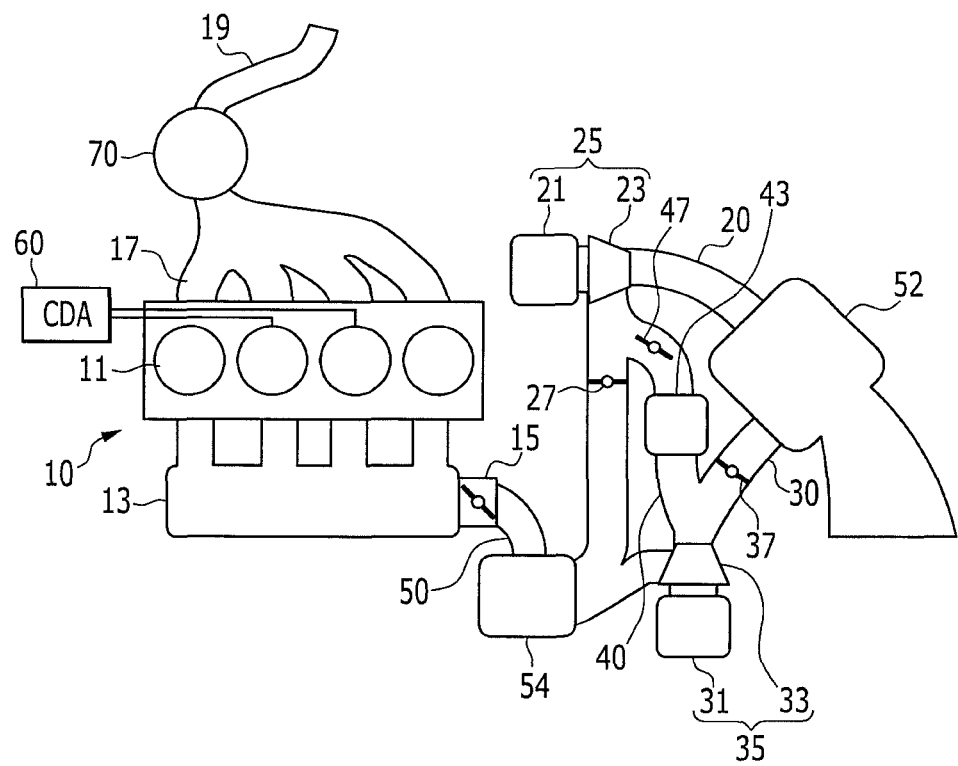
FIG. 1 is a schematic view illustrating an engine system according to exemplary embodiments of the present disclosure.

The present disclosure will be described more fully hereinafter with reference to the accompanying drawings, in which exemplary embodiments of the disclosure are shown. As those skilled in the art would realize, the described embodiments may be modified in various ways, all without departing from the spirit or scope of the present disclosure.

In describing the present disclosure, parts that are not related to the description will be omitted. Like reference numerals generally designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., may be exaggerated for clarity.

Hereinafter, an engine system according to exemplary embodiments of the present disclosure will be described in detail with reference to accompanying drawings.

Figure 2:
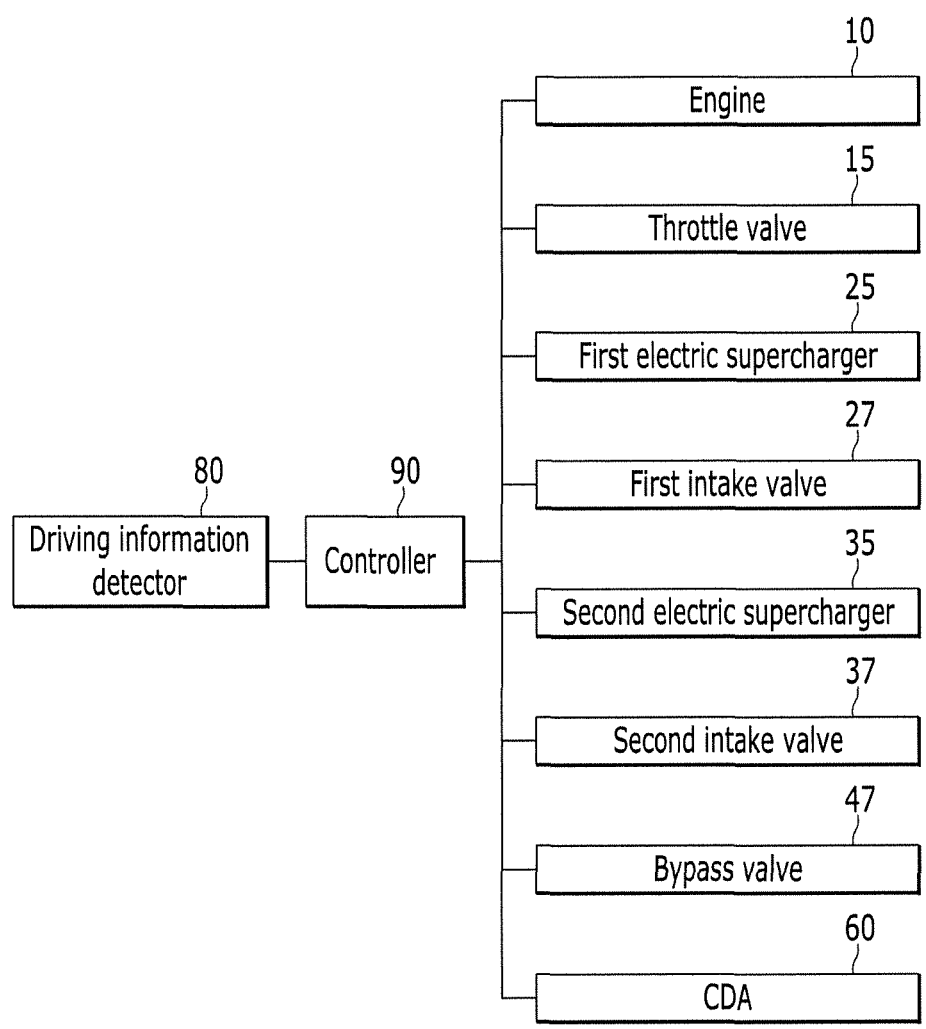
FIG. 2 is a block diagram illustrating an engine system according to exemplary embodiments of the present disclosure.

FIG. 1 is a schematic view illustrating an engine system according to exemplary embodiments of the present disclosure. FIG. 2 is a block diagram illustrating an engine system according to exemplary embodiments of the present disclosure.

As shown in FIG. 1 and FIG. 2, the engine system according to exemplary embodiments of the present disclosure includes an engine 10 including a plurality of cylinders 11 generating driving torque by burning a fuel, a plurality of intake lines through which external air is supplied to the cylinders 11 flows, and electric superchargers disposed in, on or near the plurality of intake lines, respectively.

Intake air is supplied to one or more cylinders 11 of the engine 10 and passes through the plurality of intake lines. Exhaust gas is discharged from the cylinder 11 and exhausted to the outside through an exhaust manifold 17 and an exhaust line. An exhaust gas purifying apparatus 70 may be disposed in, along or near the exhaust line.

The plurality of intake lines includes a first intake line 20 and a second intake line 30 by which external air is supplied to the cylinders 11. However, this is not restrictive.

A bypass line 40 which connects the first intake line 20 and the second intake line 30 is disposed between the first intake line 20 and the second intake line 30. That is, the bypass line 40 is branched from the first intake line 20 and merged into the second intake line 30.

The electric superchargers disposed in the first intake line 20 and the second intake line 30, respectively, are for supplying compressed air to the cylinders. The electric superchargers include a motor and an electric compressor. The electric compressor is operated by the motor and compresses intake air, and the compressed intake air is supplied to the cylinders 11.

A first intake valve 27 is disposed in the first intake line 20. The first intake valve 27 may be disposed at a downstream portion of the first electric supercharger 25 disposed in the first intake line 20. An intake air amount supplied through the first intake line 20 is adjusted by opening, or selectively opening, the first intake valve 27.

A second intake valve 37 is disposed in the second intake line 30. The second intake valve 37 may be disposed in a downstream portion of the second electric supercharger 35 disposed in the second intake line 30. An intake air amount supplied through the second intake line 30 is adjusted by opening, or selectively opening, the second intake valve 37.

The first intake line 20 and the second intake line 30 are merged into a main intake line 50, and a main intercooler 54 is disposed in the main intake line 50. Supercharged air compressed by the electric supercharger is cooled by the main intercooler 54.

A bypass valve 47 is disposed in the bypass line 40. A complementary intercooler 43 may be disposed in the bypass line 40. Supercharged air compressed by the first electric supercharger 25 is cooled by the complementary intercooler 43.

An air cleaner 52 for filtering external air is disposed in an entrance of the first intake line 20 and the second intake line 30.

External air inflowing through the first intake line 20 and the second intake line 30 is supplied to the cylinders 11 through an intake manifold 13. A throttle valve 15 is disposed in the intake manifold 13, and adjusts an air amount supplied to the cylinder 11.

The engine system according to exemplary embodiments of the present disclosure may further include a cylinder deactivation apparatus (CDA) 60 for selectively deactivating one or more of the plurality of cylinders 11.

The CDA (cylinder deactivation apparatus) 60 is disposed at or near one or more of the cylinders, and selectively deactivates some of the cylinders. When the CDA apparatus 60 is operated, fuel is not supplied to a deactivated cylinder, and operations of a corresponding intake valve and exhaust valve are stopped. The CDA apparatus 60 is widely known in the art, so a more detailed description thereof will not be presented in the present specification.

The CDA apparatus 60 may be disposed at the second cylinder and the third cylinder among the four cylinders.

The engine system according to exemplary embodiments of the present disclosure may further include a driving information detector 80 for detecting driving information of a vehicle, and a controller 90 for controlling operations of the first intake valve 27, the second intake valve 37, the bypass valve 47, the first electric supercharger 25, the second electric supercharger 35, the CDA 60 and the throttle valve 15 based on the driving information.

The driving information detector 80 detects driving information including an engine torque, an engine speed, and a required, or requested, torque of a driver. The driving information is transmitted to the controller 90.

The controller 90 may be provided as at least one processor operating by a predetermined program, and the predetermined program performs each step of a method for controlling the engine system according to exemplary embodiments of the present disclosure Hereinafter, operations of the engine system according to exemplary embodiments of the present disclosure will be described in detail with reference to accompanying drawings.

The controller 90 determines a driving region, or an operational region or mode, of the engine based on the driving information detected by the driving information detector 80. The driving region may be divided into a low speed and low load region, a low and middle speed and high load region, and a high speed and high load region.

The controller 90 adjusts a supercharged air amount supplied to the cylinders 11 through controlling the first intake valve 27, the second intake valve 37 and the bypass valve 47 based on the driving region of the engine. That is, the controller 90 controls opening and closing of the first intake valve 27, the second intake valve 37 and the bypass valve 47, or an opening degree of the first intake valve 27, the second intake valve 37 and the bypass valve 47, such that a supercharged air amount supplied to the cylinders 11 is adjusted.

Figure 3:
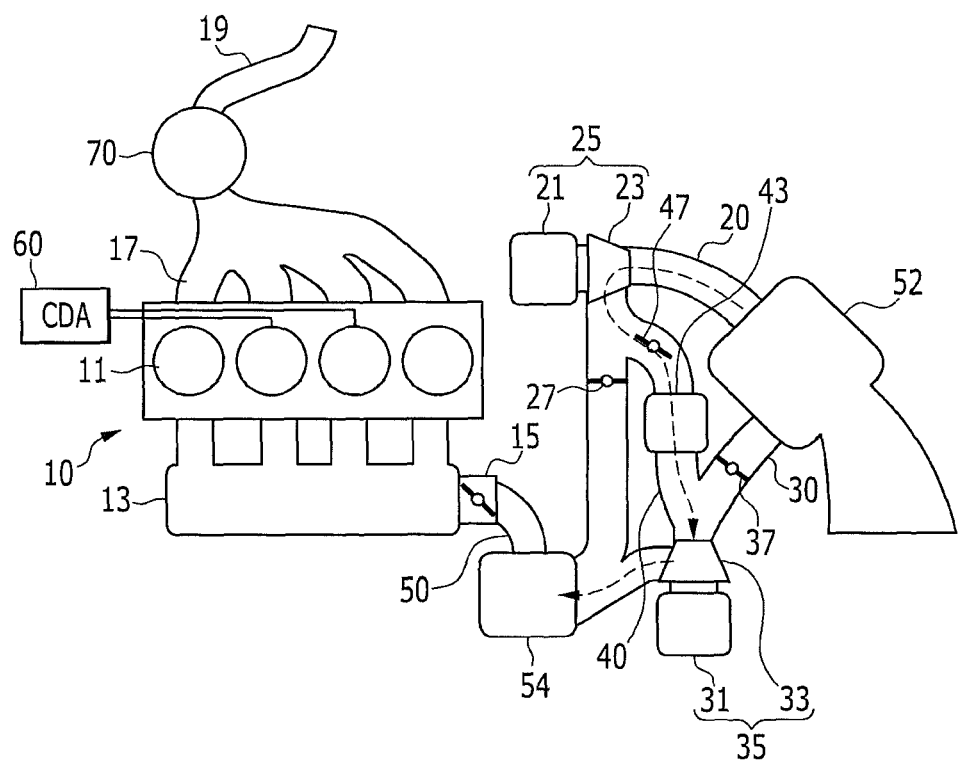
FIG. 3 is a schematic view illustrating an operation of an engine system according to exemplary embodiments of the present disclosure in a low and middle speed and high load region.

Referring to FIG. 3, in the low and middle speed and high load region, the controller 90 controls the first intake valve 27 and the second intake valve 37 to be closed and controls an opening degree of the bypass valve 47, such that a supercharged air amount supplied to the cylinder 11 is adjusted. Further, the controller 90 operates the first electric supercharger 25 and the second electric supercharger 35, such that supercharged air from the first electric supercharger 25 and the second electric supercharger 35 is supplied to the cylinder 11.

That is, external air inflowing through the first intake line is primarily compressed by the electric supercharger 25, and the external air flows into the second intake line 30 passing through the bypass line 40. Then, the external air is additionally compressed by the second electric supercharger 35.

Since a high compression ratio is needed in the low and middle speed and high load region, it is possible to increase the compression ratio of external air supplied to the cylinder 11 by operating the first electric supercharger 25 and the second electric supercharger 35 in series. Further, since external air compressed by the electric supercharger 25 is cooled by the complementary intercooler 43, a compression efficiency of external air can be improved.

Figure 4:
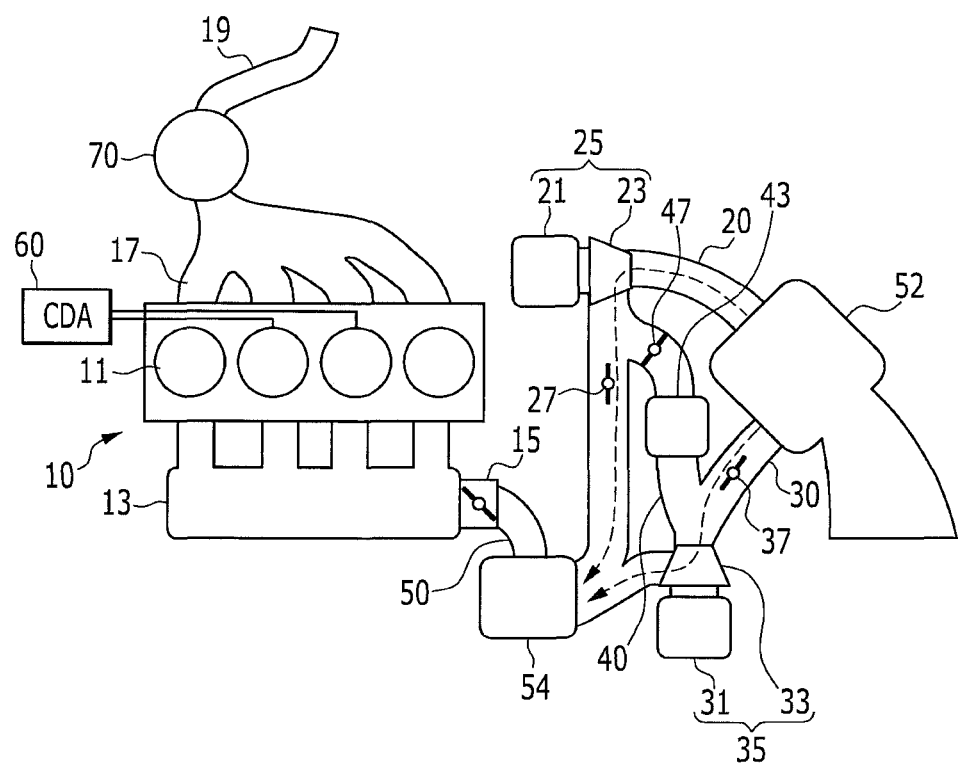
FIG. 4 is a schematic view illustrating an operation of an engine system according to exemplary embodiments of the present disclosure in a high speed and high load region.

Referring to FIG. 4, in the high speed and high load region, the controller 90 controls that the bypass valve 47 is closed and controls an opening degree of the first intake valve 27 and the second intake valve 37, such that a supercharged air amount supplied to the cylinders 11 is adjusted. Further, the controller 90 operates the first electric supercharger 25 and the second electric supercharger 35, such that supercharged air from the first electric supercharger 25 and the second electric supercharger 35 is supplied to the cylinders 11.

Since a large volume of external air supplied to the cylinders is necessary in the high speed and high load region, external air is supplied to the cylinders through the first intake line 20 and the second intake line 30. In this case, a large volume of external air can be supplied to the cylinders 11 by operating the first electric supercharger 25 and the second electric supercharger 35 in parallel.

Figure 5:
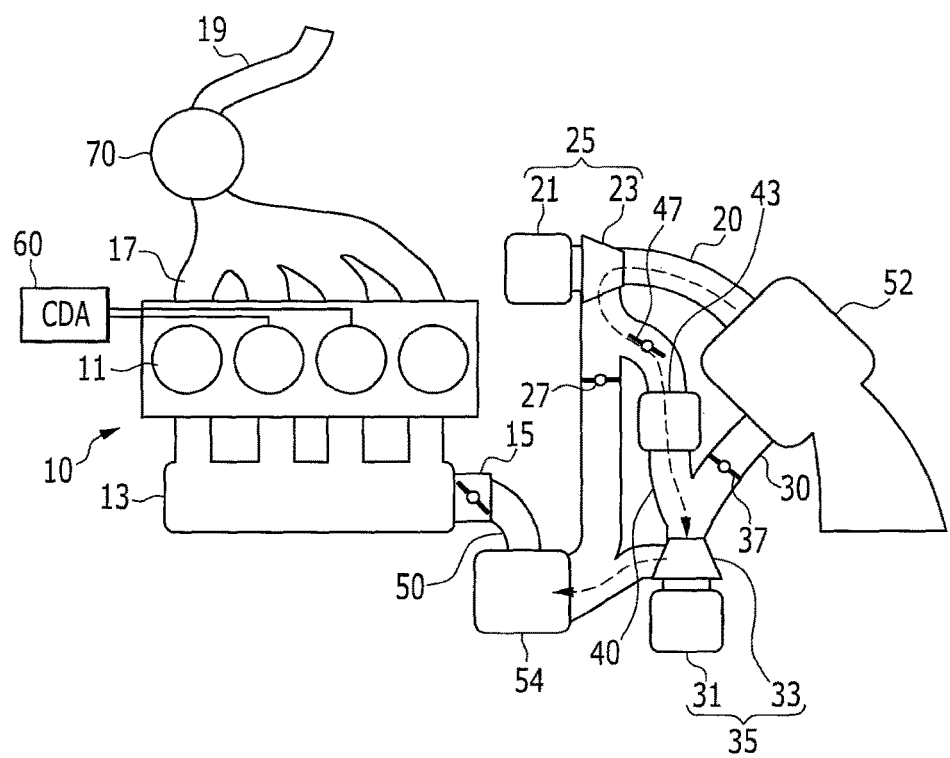
FIG. 5 is a schematic view illustrating an operation of an engine system according to exemplary embodiments of the present disclosure in a low speed and low load region.

Referring to FIG. 5, in the low speed and low load region, the controller 90 deactivates one or more cylinders of the plurality of cylinders by operating the CDA 60. The controller 90 controls that the first intake valve 27 and the second intake valve 37 are closed and controls an opening degree of the bypass valve 47, such that a supercharged air amount supplied to the cylinders 11 is adjusted. Then, the controller 90 operates the first electric supercharger 25 and the second electric supercharger 35, such that that supercharged air from the first electric supercharger 25 and the second electric supercharger 35 is supplied to the cylinders 11.

That is, external air inflowing through the first intake line is compressed by the electric supercharger 25, and the external air flows into the second intake line 30 passing through the bypass line 40. Then, the external air is additionally compressed by the second electric supercharger 35.

Figure 6:
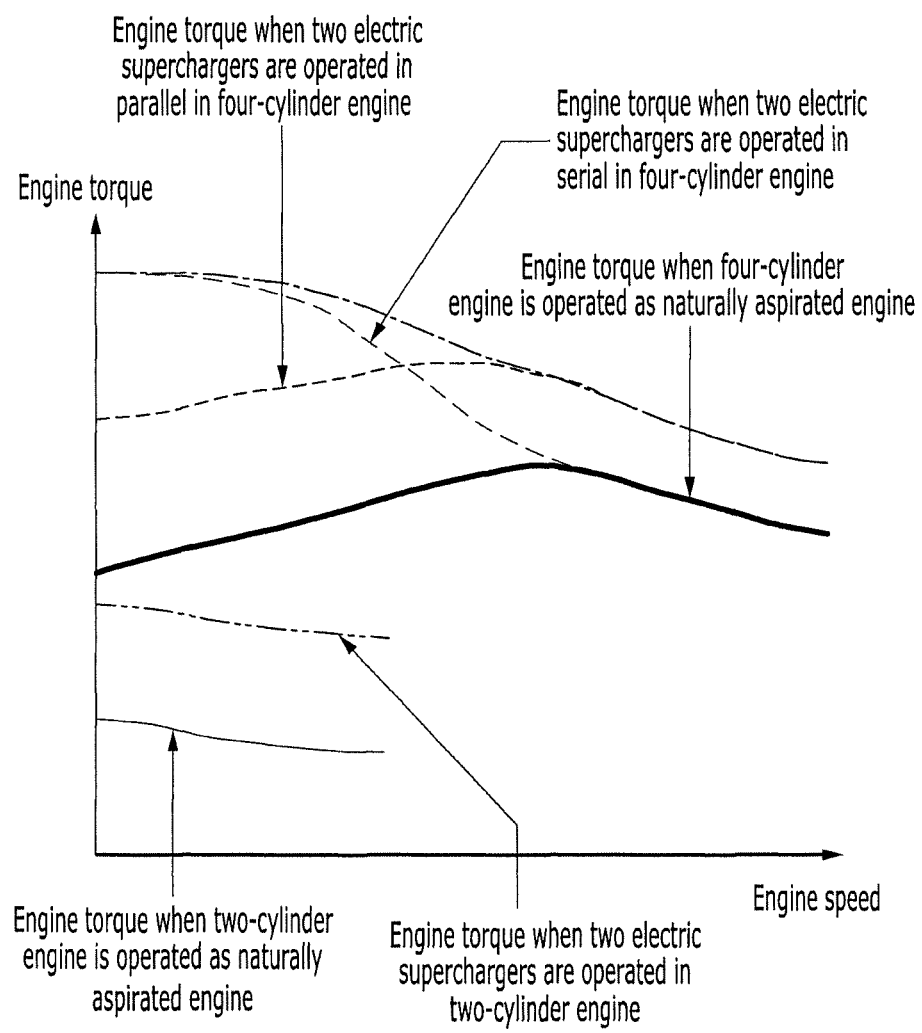
FIG. 6 is a graph illustrating operating regions of the engine system according to exemplary embodiments of the present disclosure.

Since some cylinders are deactivated in the low speed and low load region (the driving region in which the CDA operates), unnecessary pumping losses are reduced and fuel consumption is improved. Further, since supercharged air is supplied to the cylinder 11 using two electric superchargers in the low speed and low load region, the driving region in which the CDA operates can be expanded (refer to FIG. 6).

As described above, according to exemplary embodiments of the present disclosure, since a mechanical turbocharger is not disclosed and external air is compressed using a plurality of electric superchargers, back pressure can be reduced, a high compression ratio can be realized, and abnormal combustion, such as knocking, can be prevented.

Further, it is possible to increase design freedom of a vehicle and reduce manufacturing costs of the vehicle by removing a mechanical turbocharger having a relatively high volume and weight.

Further, output of the electric supercharger is limited by an electric system of a vehicle, but it is possible to increase a compression ratio of external air and improve control responsiveness using a plurality of electric superchargers.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:
1. An engine system, comprising:
   an engine including one or more cylinders for generating a driving torque;
   a plurality of intake lines for supplying external air to the one or more cylinders; and
   one or more electric superchargers disposed on, or in, at least one of the plurality of intake lines, the one or more electric superchargers including first and second electric superchargers wherein the plurality of intake lines includes:
- a first intake line through which external air supplied to the one or more cylinders flows; and
- a second intake line through which external air supplied to the one or more cylinders flows, wherein the engine system further includes:
- a bypass line connecting the first intake line and the second intake line, and through which the external air flowed into the second intake line passes;
- a first intake valve disposed in the first intake line;
- a second intake valve disposed in the second intake line; and
- a bypass valve disposed in the bypass line, wherein the first intake valve is disposed in a downstream portion of the first electric supercharger, and wherein the second intake valve is disposed in an upstream portion of the second electric supercharger, wherein the first intake valve, the second intake valve and the bypass valve are selectively opened, or an opening of each of the first intake valve, the second intake valve and the bypass valve is adjusted based on a driving region of the engine, wherein the first intake valve and the second intake valve are closed, supercharged air amount is adjusted by an opening of the bypass valve, and supercharged air is supplied to the one or more cylinders by the first electric supercharger and the second electric supercharger in a middle speed and high load region, and wherein the bypass valve is closed, supercharged air amount is adjusted by opening of the first intake valve and the second intake valve, and supercharged air is supplied to the one or more cylinders by the first electric supercharger and the second electric supercharger in a high speed and high load region.

2. The engine system of claim 1, wherein
the first intake line and the second intake line are merged into a main intake line, and a main intercooler is disposed in the main intake line.

3. The engine system of claim 1, further comprising:
a complementary intercooler disposed in the bypass line.

4. The engine system of claim 1, further comprising a cylinder deactivation apparatus (CDA) disposed in one or more cylinders of the plurality of cylinders, the CDA selectively deactivating one or more of the plurality of cylinders.

5. The engine system of claim 4, wherein the engine is a four-cylinder engine sequentially including four cylinders of a first cylinder, a second cylinder, a third cylinder, and a fourth cylinder, and
the CDA is disposed in the second cylinder and the third cylinder.

6. The engine system of claim 4, wherein, when conditions in which the first intake valve and the second intake valve are closed, supercharged air amount is adjusted by an opening of the bypass valve, and supercharged air is supplied to the one or more cylinders through the first electric supercharger and the second electric supercharger, are met, the CDA operates.

7. The engine system of claim 4, wherein the driving region which the CDA operates is a low speed and low load region.

* * * * *